Oct. 15, 1968     J. POLON     3,405,431
TURN FOR HANDBAG CLOSURE
Filed April 13, 1966

United States Patent Office 3,405,431
Patented Oct. 15, 1968

3,405,431
TURN FOR HANDBAG CLOSURE
Joseph Polon, 210 Birch Drive,
New Hyde Park, N.Y. 11040
Filed Apr. 13, 1966, Ser. No. 542,254
7 Claims. (Cl. 24—221)

ABSTRACT OF THE DISCLOSURE

A turn such as is commonly used for securing the flap of a lady's handbag, including a knob and a shell, the knob having a locking position and a release position separated by a quarter-turn. The knob has a squared shank that is gripped between the legs of a generally hairpin-shaped spring that is confined in the shell. The extremities of the legs are confined against spreading when the turn is indexed between its locking and released positions. The spring provides firm pressure against the shank for gripping the knob securely in either its locked or leased positions, without resort to a heavy or bulky spring.

---

The present invention relates to turns, such as are used as fasteners for ladies' handbags and in various other applications.

A turn conventionally includes a stationary shell, a manual knob rotatable on the shell, and a spring for retaining the knob on the shell. The knob is elongated, transverse to its axis. It moves between one position in which it extends in locking position across an elongated opening in a handbag flap or the like, and another position along the opening so as to release the flap. The spring also acts as a detent for holding the knob in either position.

Vast numbers of turns are made, and the product is a highly competitive device. A small change in such a device can be of considerable practical importance. Thus, a form of turn in which the manual knob and the retaining stem of the knob were separate parts that were assembled in assembling the turn could be obsolete, in favor of a form of turn that can be assembled of only three parts, namely a shell, a retaining and detent spring, and a one-piece knob having integral manual and stem parts.

An object of the present invention resides in the provision of a novel form of turn of the foregoing character, having many advantages. Turns pursuant to the invention are economical to manufacture, strong and durable, and they are capable of use in applications where only a limited height of the shell is of importance. A spring of modest proportions can be used, and yet firm action is realized in retaining the knob in each of its locking and releasing positions on the shell.

In the illustrative embodiment described below and shown in the annexed drawing, the knob has a projecting stem extending into the shell, and a hairpin-shaped spring extends across the axis of the stem and embraces a square shank of the stem. The shell contains and confines the spring, preventing any appreciable lateral movement of the spring either at the bight of the spring or at the ends of the spring legs. Because the ends of the spring legs are confined by the shell, rotation of the knob enforces bowing of the spring legs. This is of particular advantage since it imparts firm retention of the turn without resort to an unduly thick spring or a spring requiring much space. Further features of specific value are discussed below.

Figure 1:
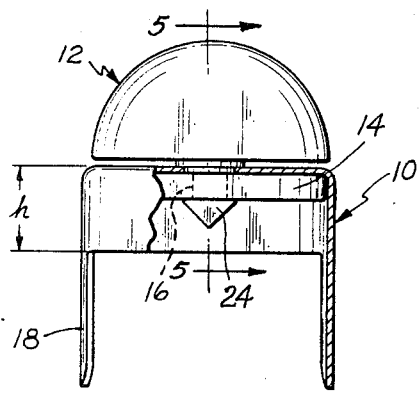
FIGURE 1 is an enlarged lateral view of a novel turn embodying features of the invention, parts being broken away and shown in section.
Figure 2:
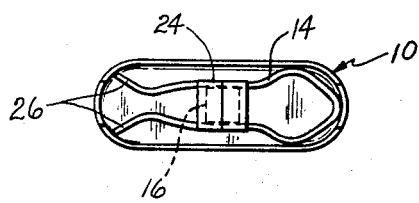
FIGURE 2 is a bottom plan view of the turn shown in FIG. 1.
Figure 3:
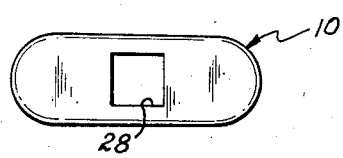
FIGURE 3 is a top plan view of shell 10 of the turn in FIG. 1.
Figure 5:
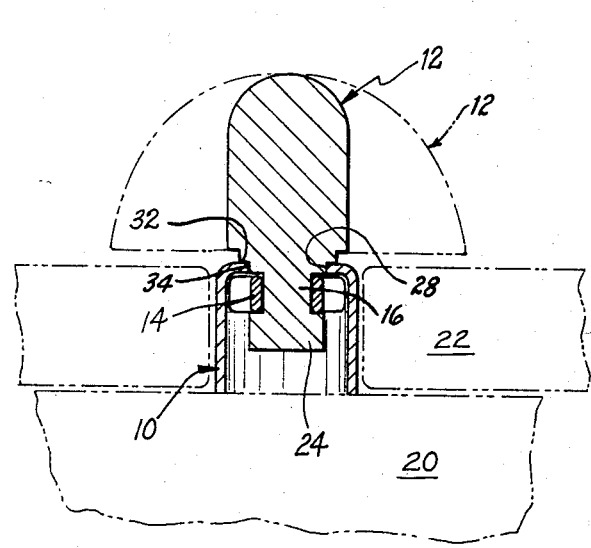

FIGURE 5 is an enlarged cross-section of the turn in FIGS. 1 and 2 as viewed from the section line 5—5 in FIG. 1, the knob 12 being shown in solid lines and in dotted lines to represent its two operative positions, and parts 20 and 22 of a handbag being shown in phantom lines to indicate an application of the novel turn.

In FIGS. 1 and 2 a turn is shown that includes a shell 10 which rotatably supports a knob 12. A spring 14 retains knob 12 in assembly to shell 10, and this spring also grips the shank 16 of knob 12. Since shank 16 is of square cross-section, the knob tends to remain in one of two positions relative to shell 10, either along the shell or transverse to the shell.

When the whole unit of FIGS. 1 and 2 is used as illustrated in FIG. 5, shell 10 is mounted by means of prongs 18 to an article such as side-wall 20 of a lady's handbag. A flap 22 of the handbag is moved against side-wall 20 so that an opening in the flap fits over and closely around shell 10. The thickness of the flap is equal to or slightly less than the height $h$ of shell 10. Knob 12 is in the position shown in solid lines in FIG. 5 when the flap is moved against the side-wall 20 of the handbag. When turned 90° to assume the dotted-line position, the knob retains the flap in position. This is due to the proportions of the knob, which is longer than its thickness, measured transversely to its rotational axis. Another turn of knob 12 through 90° aligns the knob with the opening in the flap so that the handbag can be opened.

Application of a turn to a handbag is illustrative, but even in this one application there is demand for an enormous number of such devices. In a handbag it may be expected that the turn will be worked a great many times, so durability is important. Further, the design of the handbag may be such as to require a small height $h$ of the shell. The present invention is of advantage in economically satisfying these considerations. Height $h$ can be made quite small and still there is adequate space for the detent parts contained in the shell. Further, the novel turn can be operated indefinitely without signs of wear.

Figure 4:
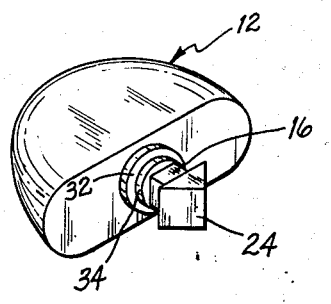
FIGURE 4 is an enlarged perspective view of the knob 12 in FIGS. 1 and 2.

As seen particularly in FIG. 4, turn 12 has a projecting stem including shank 16 of square cross-section and head 24 on the end of the shank that projects laterally in all directions (see FIG. 2) so as to overhang the shank. As the knob is turned through successive 90° motions, it is reliably retained in assembly to the shell, since in all positions the head 24 overhangs the legs of spring 14.

Spring 14 is of roughly hairpin-shape, formed of flattened spring wire cut to proper lengths. As seen in FIG. 2, the legs of spring 14 midway along their length have clearance from the lateral walls of shell 10 for accommodating outward bowing of the legs which occurs as the square shank 16 is rotated. It is during this rotation that the grip of shank 16 by spring 12 should be especially firm, in order to prevent unintended rotation of the knob and accidental opening of the handbag. The ends of the spring in the position of FIG. 2 touch (or at least nearly touch) the inside surface of shell 10 so that shell 10 confines the spring ends. In the form of shell shown, the end walls are rounded, and the end portions 26 of the spring legs diverge so as to thrust directly outward against the wall of the shell. Enforced bowing of the spring legs occurs when the knob is turned. The opposite ends of the spring (the bight and the extremities of the legs) are confined in the cavity of shell 10, thereby preventing rotation of the knob and the spring as a unit.

Knob 12 has a circular raised bearing area 32 whose diameter is approximately equal to the diagonal of square opening 28 in the shell, and knob 12 has another raised circular area 34 on bearing area 32 that is slightly smaller than one side edge of square opening 28. This opening is large enough to admit head 24 when the knob is being assembled to the shell. Thus, when the projecting part 16, 24 of knob 12 is received in the shell, raised area 34 has a rotating fit in opening 28 and bearing area 32 covers opening 28 and provides clearance spacing between the lower face of knob 12 and the top 30 of shell 10.

Spring 14 lies against the inside surface at the top of the shell. The spring is made of flattened spring wire inherently having rounded longitudinal edges or, at least, being free of sharp edges such as those resulting from cutting. The flat face of each spring leg bears against opposite flat faces of shank 16. The width of the spring occupies the space between the overhang of head 24 and the inside surface of the shell, thereby retaining knob 12 securely in assembly to shell 10 as shown. The smooth edges of the spring confront the overhanging head. Any engagement between head 24 and spring 14 involves only nominal wear when knob 14 is turned many times in the life of the device.

When knob 12 is being assembled to shell 10, spring 14 may be held in its proper place in the shell by a tool or fixture. Alternatively, the spring may be forced into the position shown after the knob is in place. In either case the sloping end surfaces of head 24 act during the assembling operation to forcibly spread the legs of spring 14. As the spring legs snap under the overhang of head 24, the rounded edges of the illustrated spring act somewhat like cam surfaces in drawing the knob firmly downward into proper assembly to the shell, as described above.

The fact that the spring ends 26 are confined by shell 10 against spreading during rotation of the turn, and at the opposite end the legs are joined by a round bight, means that outward bowing of the spring must occur as the knob is turned. This bowing of each spring leg results in relatively firm bearing of the spring legs against square shank 16. This is much firmer spring pressure than would be realized if spring ends 26 were not confined against spreading. The legs of the spring are prebiased against the flat faces of shank 16, due to the shape of the spring and apart from any effect of shell 10.

The use of leaf-spring stock rather than round spring wire is of advantage, in that round wire would correspondingly require complementary inward curvature of the surfaces of shank 16 as shown in FIG. 5, and this would weaken the shank. However, both forms of spring are useful, broadly. Of importance is the avoidance of sharp edges of the spring against the overhanging head, so that rounded spring stock such as round spring wire or a leaf-spring having rounded longitudinal edges rather than edge-cut spring strip should be used.

Notably, the entire length of that part of knob 12 that projects into shell 10 is essenially short, yet an adequately firm detent spring is contained in the shell. This minimized length of the stem 16, 24 makes possible a relatively small shell height $h$, a feature of special advantage where the flap 22 is thin. In a practical form, projection 16, 24 is a die casting projecting integrally from the manual portion of the knob. The stem in a practical example is only $3/16$ inch long on a knob that has a manual part $1/2$ inch high, measured along the twist axis.

Figure 6:
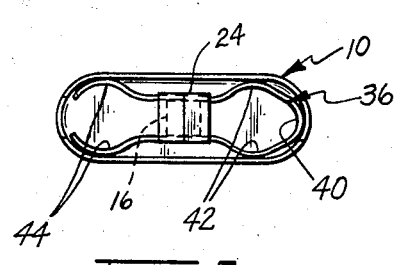

A modified form of spring 36 is shown in FIG. 6, in a turn that is otherwise identical to that in FIGS. 1–5. Spring 36 is of the same flat-wire stock as that of spring 14 so as to appear the same as spring 14 in FIGS. 1 and 5. As in the case of spring 14, the legs of spring 36 extend from a bight 40 that has portions 42 curved outward so as to be laterally confined by engaging the shell 10. The end portions 44 of the spring legs are curved outward and engage the wall of shell 10. Between these outwardly curved portions 42 and 44, the legs of the spring are spaced from the lateral wall (as in FIG. 2 wherein the bight of the spring is of the same contour) so as to provide clearance for outward bowing of the spring legs when the knob is rotated.

Engagement of portions 42 and portions 44 with the shell in the normal position of the turn (as shown) is desirable since this provides firm spring-enforced orientation of knob 12 along—or across—the elongated shell 10. Some slight unintended clearance may exist between the shell and the portions 42 and 44. This clearance correspondingly would allow some slight twisting movement of knob 12 and spring 36 as a unit. Even in this case, portions 44 bear against the walls of shell 10 during most of the twisting movement, to enforce outward bowing of the spring legs and thus to afford firm spring action tending to locate the knob in either of its two positions, aligned or transverse to the shell. Knob 12 is retained securely in shell 10 by cooperation of head 24 with the wire, and since only the rounded longitudinal edges of the spring engage head 24, a durable and rugged turn results that is susceptible of compact design where required.

The foregoing embodiments of the invention afford advantages not found in any known form of turn, and the novel turn in each form shown satisfies certain considerations uniquely. Nevertheless, it will be recognized that certain variations may be introduced by those skilled in the art without departing from the spirit and scope of the invention.

What is claimed is:

1. A turn, including a shell, a knob, and a knob-retaining detent spring, said shell having a top and elongate side walls and narrow end walls defining an elongate cavity, said knob having a manual part at the top of the shell and an integral stem extending into said cavity through an opening in said top, said stem including a shank of square cross-section having opposite pairs of surfaces and a head projecting laterally beyond the shank in all directions, and said spring having two legs extending from a bight, portions of said legs between the bight and the respective extremities of the legs remote from the bight gripping an opposite pair of surfaces of said shank therebetween for holding said knob in plural stable positions, said legs lying against the inner surface of the top of the shell and the spring legs substantially filling the space between said top of the shell and said laterally projecting head, said shell locating the bight of the spring and confining and at least nearly touching said extremities of said spring legs when said knob is in any of said stable positions so as to enforce outward bowing of each of the spring legs when the knob is turned.

2. A turn in accordance with claim 1, wherein said end walls are curved so that said cavity has rounded ends, and wherein the end portions of the spring legs define a diverging angle for directly outward thrust against the wall of the cavity.

3. A turn in accordance with claim 1, wherein said spring is of leaf-spring stock having flat faces and rounded longitudinal edges, said shank having substantially flat faces gripped between flat faces of the spring, and said laterally projecting head engaging said rounded longitudinal edge portions of the spring.

4. A turn in accordance with claim 1, wherein said stem is much smaller than the manual part of the knob, so that a shell that is shallow, measured along the turning axis of the knob, may contain the stem.

5. A turn in accordance with claim 1, wherein said spring is free of sharp edges along the length thereof.

6. A turn in accordance with claim 1, wherein said knob, including said manual part and said shank and said head are of one piece, and wherein said head is small enough to pass through said opening in the top of the shell and has converging end surfaces for enabling the knob to be assembled to the shell by inserting said head through said opening, said converging end surfaces of said head spreading the legs of the spring, the latter thereafter snapping under the head and thus completing the assembly of the turn.

7. A turn in accordance with claim 1, wherein said spring is of leaf-spring stock having flat faces gripping said shank and having rounded longitudinal edges substantially in engagement with said laterally projecting head.

References Cited

UNITED STATES PATENTS

| 152,774 | 7/1874 | Steele | 292—204 |
| 1,287,220 | 12/1918 | Carr. | |
| 1,334,845 | 3/1920 | Dulac et al. | 24—221 |

FOREIGN PATENTS

| 328,231 | 4/1903 | France. |

BOBBY R. GAY, *Primary Examiner.*

E. SIMONSEN, *Assistant Examiner.*